United States Patent
Wang

(10) Patent No.: US 11,917,419 B2
(45) Date of Patent: Feb. 27, 2024

(54) METHODS AND DEVICES FOR UPLINK DATA TRANSMISSION AND SCHEDULING

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 16/632,106

(22) PCT Filed: Jul. 21, 2017

(86) PCT No.: PCT/CN2017/093930
§ 371 (c)(1),
(2) Date: Jan. 17, 2020

(87) PCT Pub. No.: WO2019/014943
PCT Pub. Date: Jan. 24, 2019

(65) Prior Publication Data
US 2020/0178082 A1    Jun. 4, 2020

(51) Int. Cl.
*H04W 16/14* (2009.01)
*H04W 72/1268* (2023.01)

(52) U.S. Cl.
CPC ....... *H04W 16/14* (2013.01); *H04W 72/1268* (2013.01); *H04W 74/0808* (2013.01)

(58) Field of Classification Search
CPC ............ H04W 16/14; H04W 72/1268; H04W 74/0808
(Continued)

(56) References Cited

U.S. PATENT DOCUMENTS 10,880,921 B2 * 12/2020 Babaei ................ H04W 74/006
2014/0036853 A1    2/2014 Kim et al.
(Continued)

FOREIGN PATENT DOCUMENTS

CN        106465411 A      2/2017
CN        106716908 A      5/2017
(Continued)

OTHER PUBLICATIONS

The Extended European Search Report dated Dec. 8, 2020, issued by the European Patent Office in application No. 17917973.4.
(Continued)

*Primary Examiner* — Kwang B Yao
*Assistant Examiner* — Syed M Bokhari
(74) *Attorney, Agent, or Firm* — Sughrue Mion, PLLC

(57) ABSTRACT

Embodiments of the present disclosure relate to a method, terminal device and apparatus for UL data transmission and a method, network device and apparatus for UL data scheduling. In an embodiment of the present disclosure, the method of DL data transmission may comprise receiving, from a network device, information on a starting position of uplink data transmission on the unlicensed band; and determining the starting position of uplink data transmission from the information on the starting position of uplink data transmission, wherein the determined starting position of uplink data transmission is associated with a to-be-used carrier numerology With embodiments of the present disclosure, it could enable the UL data transmission on the unlicensed band in the NR system and thus improve the performance of the NR system.

15 Claims, 7 Drawing Sheets

(58) Field of Classification Search
USPC .................................................. 370/329, 336
See application file for complete search history.

(56) References Cited

U.S. PATENT DOCUMENTS

| | | | | |
|---|---|---|---|---|
| 2014/0036889 | A1* | 2/2014 | Kim | H04L 5/001 |
| | | | | 370/336 |
| 2017/0303306 | A1 | 10/2017 | Lee et al. | |
| 2017/0325225 | A1* | 11/2017 | Dinan | H04W 72/0446 |
| 2017/0331577 | A1* | 11/2017 | Parkvall | H04L 5/1469 |
| 2018/0242372 | A1* | 8/2018 | Yang | H04W 72/12 |
| 2018/0317244 | A1* | 11/2018 | Um | H04W 72/1215 |
| 2019/0150170 | A1* | 5/2019 | Park | H04W 74/08 |
| | | | | 370/329 |
| 2019/0261388 | A1 | 8/2019 | Yoon et al. | |
| 2019/0320463 | A1* | 10/2019 | Yamada | H04W 16/14 |
| 2020/0229231 | A1* | 7/2020 | Oh | H04W 72/042 |
| 2021/0045042 | A1* | 2/2021 | Nakashima | H04W 48/16 |
| 2021/0119758 | A1* | 4/2021 | Park | H04L 5/0092 |
| 2021/0168837 | A1* | 6/2021 | Matsumura | H04L 5/0048 |

FOREIGN PATENT DOCUMENTS

| | | |
|---|---|---|
| WO | 2016/041578 A1 | 3/2016 |
| WO | 2017/025484 A1 | 2/2017 |

OTHER PUBLICATIONS

LG Electronics, "Discussion on multiple starting and ending positions for LAA UL", 3GPP TSG RAN WG1 Meeting #89, R1-1709160, Hangzhou, P.R. China, May 15-19, 2017, 4 pages.
Intel Corporation, "Remaining issues with PUSCH structure", 3GPP TSG RAN WG1 Meeting #86, R1-166506, Gothenburg, Sweden, Aug. 22-26, 2016, 7 pages.
Written Opinion for PCT/CN2017/093930, dated Apr. 18, 2018.
International Search Report for PCT/CN2017/093930, dated Apr. 18, 2018.
Office Action dated Jun. 8, 2021 in Japanese Application No. 2020-502588.
MediaTek Inc., "Interference management in NR", 3GPP TSG RAN WG1 Meeting #88bis, R1-1704450, Spokane, USA, Apr. 3-7, 2017 (26 pages total).
Chinese Office Action for CN Application No. 201780093387.1, dated Feb. 14, 2023 with English Translation.

* cited by examiner

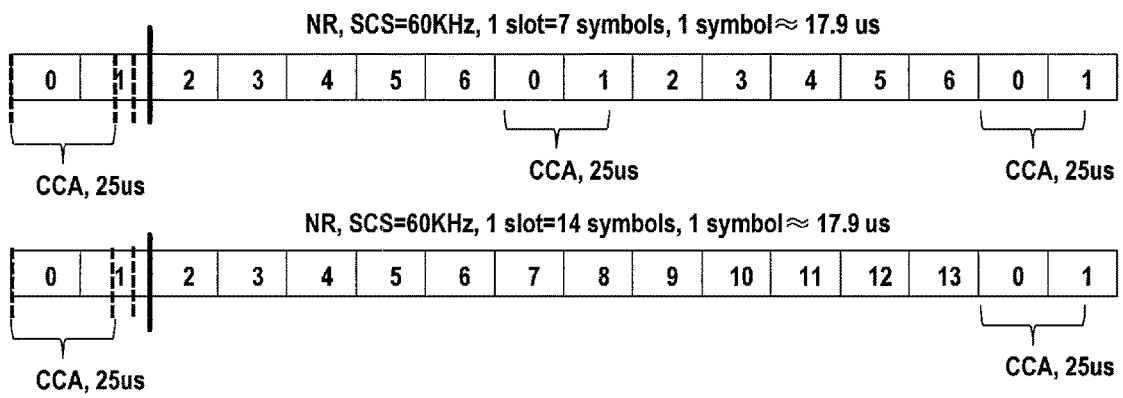
Fig. 9
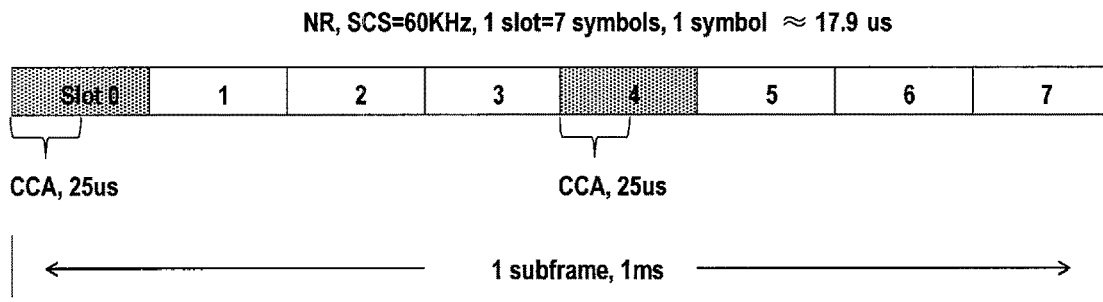
Fig. 10
|  | Number of symbols in a slot | Number of CCA slots in subframe |
|---|---|---|
| 30KHz | 7 | 2 |
|  | 14 | 1 |
| 60KHz | 7 | 4 |
|  | 14 | 2 |
| 120KHz | 7 | 8 |
|  | 14 | 4 |
| 240KHz | 7 | 16 |
|  | 14 | 8 |
Fig. 11

METHODS AND DEVICES FOR UPLINK DATA TRANSMISSION AND SCHEDULING

FIELD OF THE INVENTION

The non-limiting and exemplary embodiments of the present disclosure generally relate to the field of wireless communication techniques, and more particularly relate to a method, terminal device and apparatus for uplink data transmission and a method, network device and apparatus for uplink data scheduling.

BACKGROUND OF THE INVENTION

In order to improve the data rate performance, in the third generation Partnership Project (3GPP) Long Term Evolution (LTE), there is introduced Licensed-Assisted Access (LAA) for both downlink and uplink transmission.

In order to further improve the user's performance, a new radio access system, which is also called as NR system or NR network, has been introduced as the next generation communication system. As the LTE network enters its next phase of evolution with the study of wider bandwidth waveform under the NR project, it is natural for the LAA networks to evolve into the 5G NR system. In RAN meeting #76, a study item called "Study on NR-Based Access to Unlicensed Spectrum" had been agreed.

Regarding the LAA in the NR system, it shall study physical channels inheriting choices of duplex mode, waveform, carrier bandwidth, subcarrier spacing, frame structure, and physical layer design. It shall also study how to avoid unnecessary divergence with decisions made in the NR WI.

Thus, there is a need for a new solution of UL data transmission and scheduling.

SUMMARY OF THE INVENTION

To this end, in the present disclosure, there is provided a new solution for uplink data transmission and scheduling, to mitigate or at least alleviate at least part of the issues in the prior art.

According to a first aspect of the present disclosure, there is provided a method for uplink data transmission on an unlicensed band. The method may comprise receiving, from a network device, information on a starting position of uplink data transmission on the unlicensed band, and determining the starting position of uplink data transmission from the information on the starting position of uplink data transmission, wherein the determined starting position of uplink data transmission is associated with a to-be-used carrier numerology.

According to a second aspect of the present disclosure, there is provided a method of uplink data scheduling on an unlicensed band. The method may comprise determining a starting position of uplink data transmission of a terminal device on the unlicensed band based on a to-be-used carrier numerology; and transmitting, to the terminal device, information on the determined starting position of uplink data transmission.

According to a third aspect of the present disclosure, there is provided a terminal device. The terminal device may comprise transceiver configured to receive, from the network device, information on a starting position of uplink data transmission on the unlicensed band; and a controller configured to determine the starting position of uplink data transmission from the information on the starting position of uplink data transmission, wherein the determined starting position of uplink data transmission is associated with a to-be-used carrier numerology.

According to a fourth aspect of the present disclosure, there is provided a network device. The network device may comprise a controller configured to determine a starting position of uplink data transmission of a terminal device on an unlicensed band based on a to-be-used carrier numerology; and a transceiver configured to transmit, to the terminal device, information on the determined starting position of uplink data transmission.

According to a fifth aspect of the present disclosure, there is provided a terminal device. The terminal device may comprise a processor and a memory. The memory may be coupled with the processor and have program codes therein, which, when executed on the processor, cause the terminal device to perform operations of the first aspect.

According to a sixth aspect of the present disclosure, there is provided a network device. The network device may comprise a processor and a memory. The memory may be coupled with the processor and having program codes therein, which, when executed on the processor, cause the network device to perform operations of the second aspect.

According to a seventh aspect of the present disclosure, there is provided a computer-readable storage media with computer program codes embodied thereon, the computer program codes configured to, when executed, cause an apparatus to perform actions in the method according to any embodiment in the first aspect.

According to an eighth aspect of the present disclosure, there is provided a computer-readable storage media with computer program codes embodied thereon, the computer program codes configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, it could enable the UL data transmission on the unlicensed band in the NR system and thus improve the performance of the NR system.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 9 schematically illustrates opportunities of CCA in the NR system according to an embodiment of the present disclosure;

FIG. 10 schematically illustrates another example opportunities of CCA in the NR system according to an embodiment of the present disclosure;

FIG. 11 illustrates the relationship of the number of CCA in a subframe and the to-be-used numerologies according to an embodiment of the present disclosure;

DETAILED DESCRIPTION OF EMBODIMENTS

Figure 1:
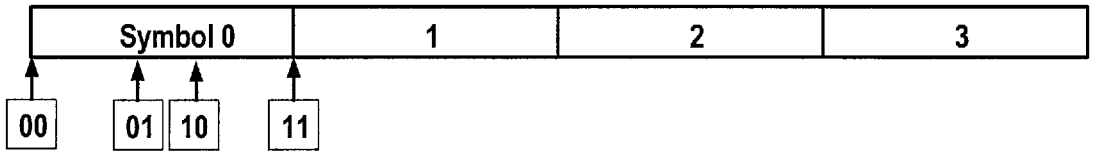
FIG. 1 schematically illustrates an example of data scheduling in the LTE system with a subcarrier spacing (SCS) of 15 KHz.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

For illustration purposes, description will be first made to the data scheduling of uplink transmission on the unlicensed band in the LTE system. As specified in section 5.3.3 of 3GPP TS 26.212.e30, Downlink Control Indication (DCI) formats 0A, 0B, 4A and 4B have been defined to schedule uplink transmission on the unlicensed band. In formats 0A/0B, 2 bits are used to indicate the starting position of physical uplink shared channel (PUSCH); in formats 4A/4B, which are designed for multi-subframe scheduling, 2 bits are used to indicate the starting position of physical uplink shared channel (PUSCH) but it can be applicable to only the first scheduled subframe. The following table illustrates relationships between values of the 2 bits and the PUSCH starting position.

TABLE 5.3.1.1A-1

| PUSCH starting position | |
|---|---|
| Value | PUSCH starting position |
| 00 | symbol 0 |
| 01 | 25 μs in symbol 0 |
| 10 | (25 + TA)μs in symbol 0 |
| 11 | Symbol 1 |

From the above table, it can be seen that in the LTE system, the UL data transmission can start from any of symbol 0, 25 μs in symbol 0, (25+TA) μs in symbol 0 or Symbol 1, wherein TA denote a time advance time to be applied.

FIG. 1 illustrates an example of data scheduling in the LTE system with a subcarrier spacing of 15 KHz. In FIG. 1, there are illustrated four possible starting positions corresponding to four possible values of the two bits.

In 3GPP RNA1 #89, it was already agreed to use one more starting position. According to outcome of offline discussion on UL partial subframes, UL partial subframe transmission start at symbol #7 is supported with both Mode 1 and Mode 2. In Mode 1, the UE may start a Rel-14 starting position or at symbol #7, which is dependent on, for example, the outcome of Listen before Talk (LBT) operations; in Mode 2, the UL grant indicates starting position at symbol #7 and additional starting positions between symbols #7 and #8 are for further study.

Figure 2:
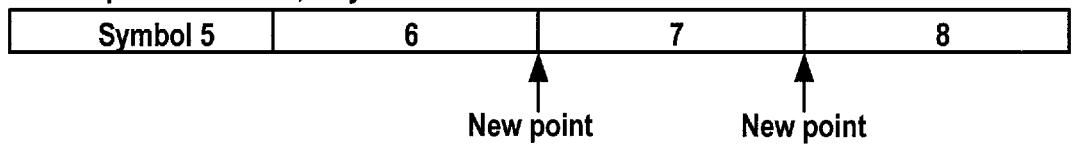
FIG. 2 schematically illustrates newly introduced starting positions in the LTE system.

FIG. 2 illustrates newly introduced starting positions in the LTE system wherein new starting positions are illustrated by arrows. From FIG. 2 it can be clear that the UL data transmission may start from the start boundary of symbol 7 and also possibly from the start boundary of symbol 8.

Figure 3:
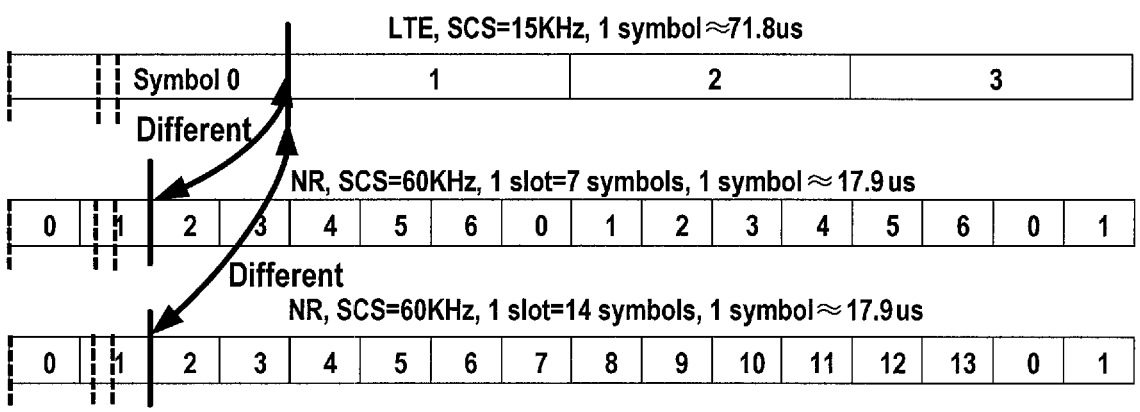
FIG. 3 schematically illustrates differences between possible starting positions of the UL data transmission in the NR system and those in the LTE system according to an embodiment of the present disclosure.

However, due to different numerologies used in the NR system, the NR symbol length may be shorter than the LTE symbol length, and thus the start symbol after CCA may be different. As an example, for SCS=60 KHz, the symbol length is about 17.9 us, which is shorter than 25 μs, so the possible starting position may be any of symbol 0 (the start boundary of the subframe), 25 μs in symbol 1, 25+TAμs in symbol 1, or symbol 2, as illustrated in FIG. 3.

In the present disclosure, there is proposed a UL data transmission and a UL data scheduling solution in the NR system to enable the LAA based UL data transmission. Hereinafter, reference will be further made to FIGS. 4 to 16 to describe the UL data transmission and scheduling solution in the NR system. It shall be appreciated that all embodiments are given for illustrative purposes and the present disclosure is not limited thereto.

Figure 4:
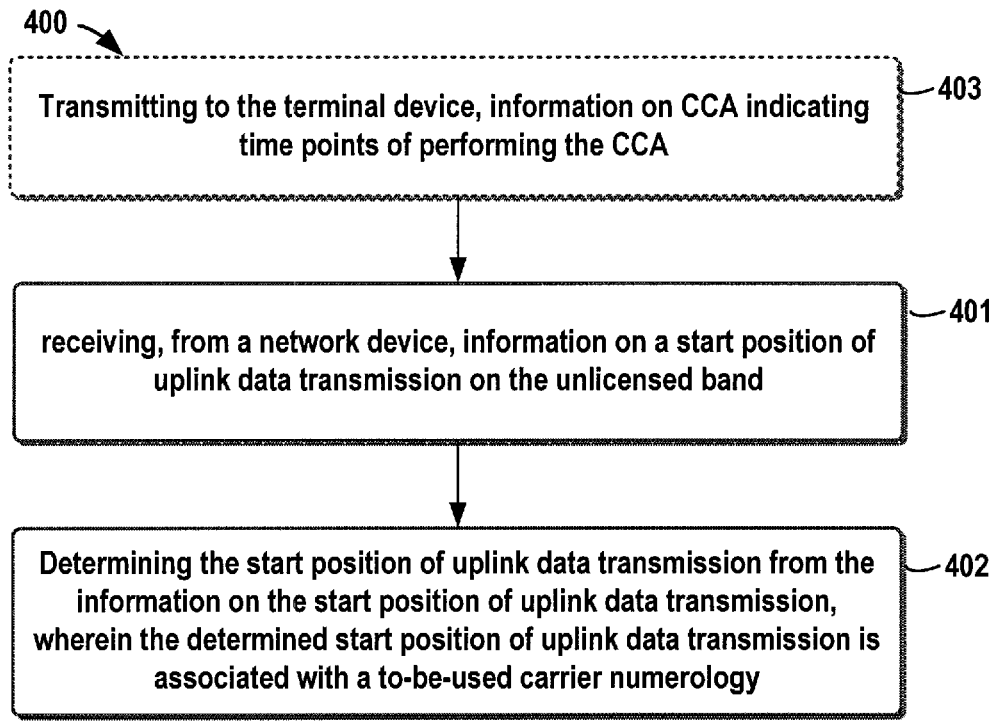
FIG. 4 schematically illustrates a flow chart of a method of uplink data transmission according to an embodiment of the present disclosure.

Reference is first made to FIG. 4, which schematically illustrates a flow chart of a method of uplink data transmission according to an embodiment of the present disclosure. The method 400 can be performed at a terminal device, for example UE, or other like terminal devices.

As illustrated in FIG. 4, first in step 401, the terminal device may receive, from a network device, information on a starting position of uplink data transmission on the unlicensed band. In other word, the terminal device will receive starting position information from the network device or network node such as base station gNB, which may determine the starting position of the UL data transmission and transmit the information which indicates the starting position of uplink data transmission.

Next in step 402, the terminal device may determine the starting position of the UL data transmission from the information on the starting position of uplink data transmission. The determined starting position of the UL data transmission is associated with the to-be-used carrier numerology. The term "numerology" used herein refers to configuration parameters for the structure of a subframe, including, for example, SCS, the number of symbols in a slot, the symbol length, and so on.

In an embodiment of the present disclosure, the possible starting positions may be determined for example as follows. It may suppose that the CCA time is denoted by Mμs and the subcarrier spacing X used in the NR system is 15 KHz*2$^n$, then the last one of the starting positions, which can be different for numerologies, can be determined as $$\text{Symbol } Y = \text{ceiling}(M/\text{symbol length}) \quad \text{(Equation 1)}$$

wherein Y is an integer, the symbol length is about (71.8/2$^n$) μs and "ceiling" means a roundup operation. Thus, the possible starting position for subcarrier X in the NR system may be any of symbol 0, M μs in symbol (Y−1), (M+TA) μs, or symbol Y. Amongst others, which symbol the (M+TA) μs is located in is dependent on the value of the TA.

For illustration purposes, FIGS. 5 to 8 schematically illustrate example possible starting positions of the UL data transmission in the NR system with different numerologies according to embodiments of the present disclosure. In these examples, M is supposed to be for example 25 μs only for illustration purposes.

Figure 5:
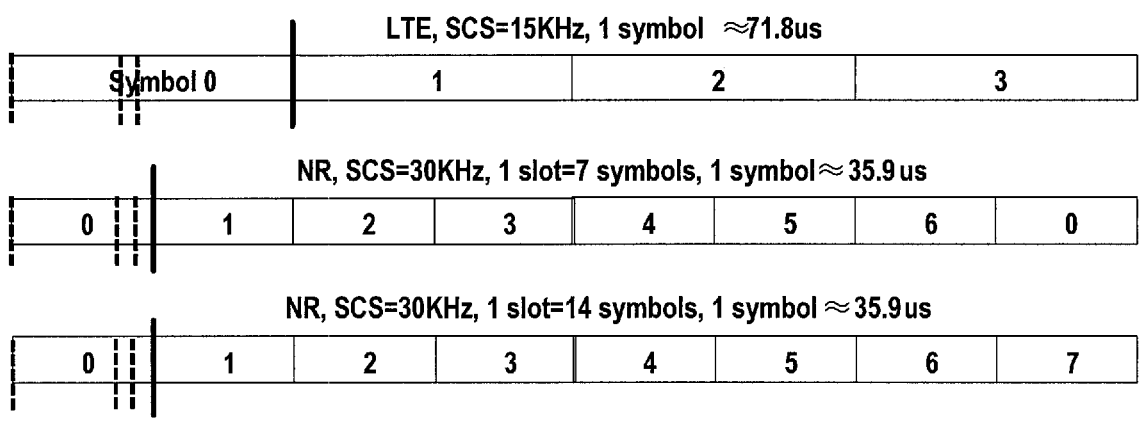
FIG. 5 schematically illustrates possible starting positions of the UL data transmission in the NR system with a SCS of 30 KHz according to an embodiment of the present disclosure.

FIG. 5 schematically illustrates possible starting positions of the UL data transmission in the NR system with a SCS of 30 KHz according to an embodiment of the present disclosure. As illustrated in FIG. 5, for the NR system, the SCS=30 KHz, which means n=1 and the symbol length=35.9p, and in such a case, Y=1. Therefore, possible starting positions as any of symbol 0, 25 μs in symbol 0, (25+TA) μs in symbol 0 or symbol 1. Thus, they are substantially same as those in the LTE system.

Figure 6:
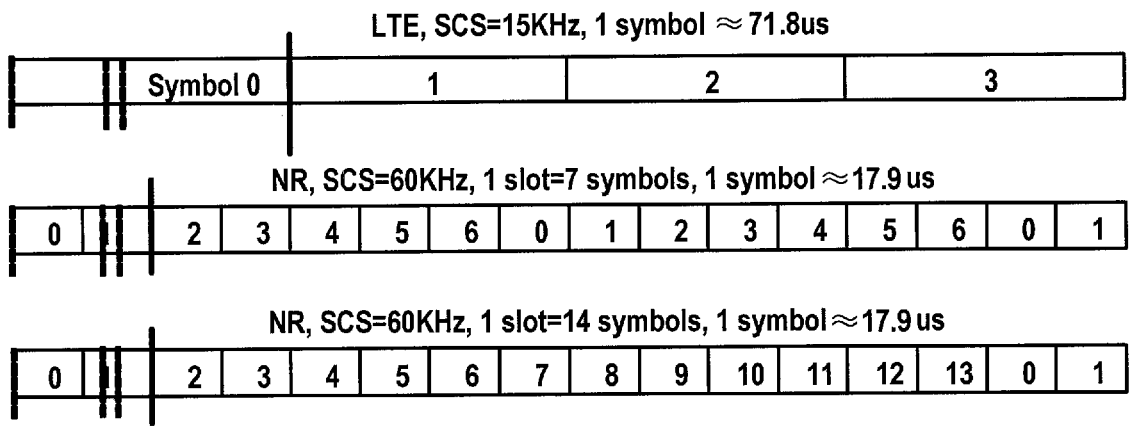
FIG. 6 schematically illustrates possible starting positions of the UL data transmission in the NR system with a SCS of 60 KHz according to an embodiment of the present disclosure.

FIG. 6 schematically illustrates possible starting positions of the UL data transmission in the NR system with a SCS of 60 KHz according to an embodiment of the present disclosure. As illustrated in FIG. 6, for the NR system, the SCS=60 KHz, which means n=2 and the symbol length=17.95 μs, and in such a case, Y=2. Therefore, possible starting positions includes any of symbol 0, 25 μs in symbol 1, (25+TA) μs in symbol 1 or symbol 2.

Figure 7:
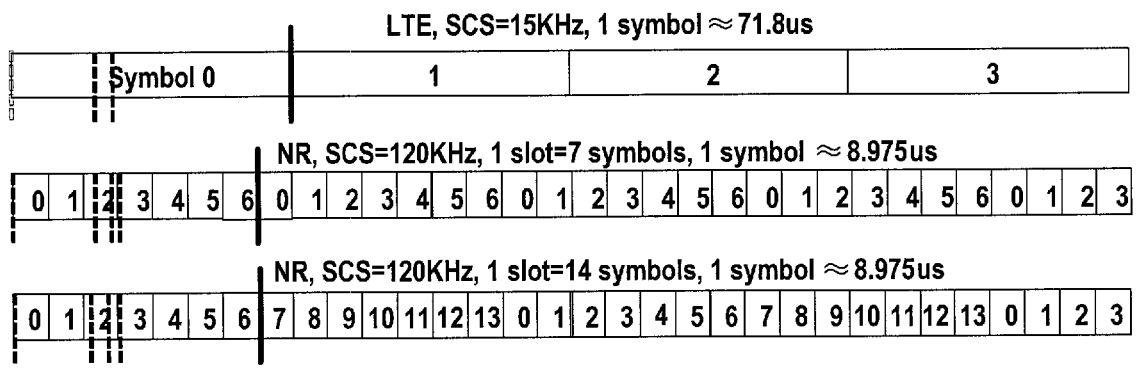
FIG. 7 schematically illustrates possible starting positions of the UL data transmission in the NR system with a SCS of 120 KHz according to an embodiment of the present disclosure.

FIG. 7 schematically illustrates possible starting positions of the UL data transmission in the NR system with a SCS of 120 KHz according to an embodiment of the present disclosure. As illustrated in FIG. 7, for the NR system, the SCS=120 KHz, which means n=3 and the symbol length=8.925 μs, and in such a case, Y=3. Therefore, possible starting positions as any of symbol 0, 25 μs in symbol 2, (25+TA) μs in symbol 2, or symbol 3. The specific symbol in which the (25+TA) μs is located is dependent on the value of the TA. In addition to or instead of symbol 3, it may also start the UL data transmission from the symbol 0 of in the next slot/subslot. For example, the UL data transmission may start from symbol 0 in the following slot, as illustrated in the middle figure of FIG. 7; or the UL data transmission may start from symbol 7, i.e., the first symbol 0 of the second subslot (a subframe contains two subslots, each of which contains 7 symbols), as illustrated in the lower figure of FIG. 7.

Figure 8:
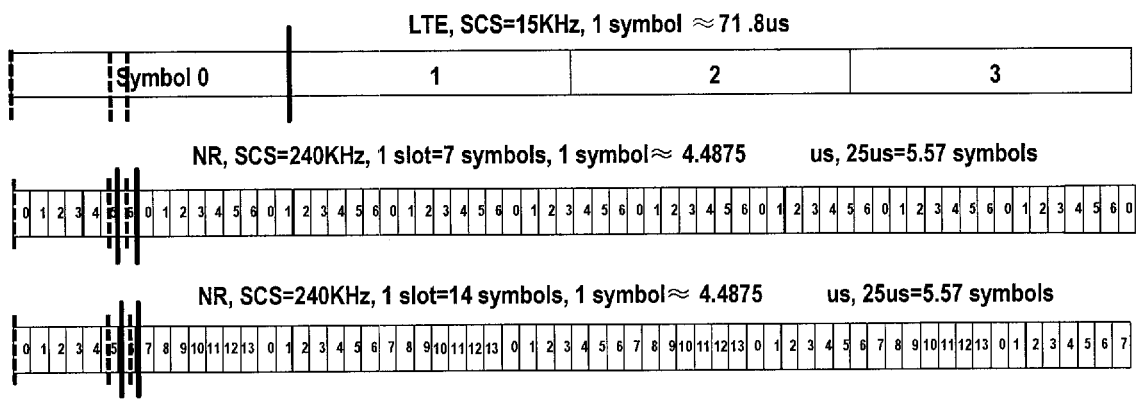
FIG. 8 schematically illustrates possible starting positions of the UL data transmission in the NR system with a SCS of 240 KHz according to an embodiment of the present disclosure.

FIG. 8 schematically illustrates possible starting positions of the UL data transmission in the NR system with a SCS of 240 KHz according to an embodiment of the present disclosure. As illustrated in FIG. 8, for the NR system, the SCS=240 KHz, which means n=4 and the symbol length=4.4875 μs, and in such a case, Y=6. Therefore, possible starting positions as any of symbol 0, 25 μs in symbol 5, (25+TA) μs in symbol 5, or symbol 6. The specific symbol in which the (25+TA) μs is located is dependent on the value of the TA. In addition to or instead of symbol 6, it may also start the UL data transmission form the symbol 0 of in the next slot/subslot.

The information on when to start the UL data transmission on the unlicensed band can be received from the network device in any suitable manners. For example, the information can be carried in DCI, RRC signaling, or etc. For example, it may use several bits to explicitly indicate the starting position of the UL data transmission on the unlicensed band alone, or alternatively indicate, together with further information, the starting position of the UL data transmission on the unlicensed band.

In an embodiment of the present disclosure, the information on the starting position of uplink data transmission can indicate the determined starting position of uplink data transmission of the terminal device alone. For example, three or more bits can be used to indicate more possible starting positions of the UL data transmission on the unlicensed band than those illustrated in for example Table 5.3.1.1A-1. As an example, three bits in DCI can be used to indicate four additional possible starting positions for UL data transmission on the unlicensed band in the NR system. As another example, four bits in DCI can be used to indicate twelve additional possible starting positions for UL data transmission on the unlicensed band in the NR system. In such a case, these bits themselves can indicate the starting position for UL data transmission on the unlicensed band in the NR system.

In another embodiment of the present disclosure, the information on the determined starting position of uplink data transmission can indicate, together with the to-be-used carrier numerology, the determined starting position of uplink data transmission of the terminal device. From the description with reference to FIGS. 5 to 8, it can be seen that the possible starting positions are related to the numerology to be used in the NR system. Thus, it is also possible to reuse, in combination with the to-be-used numerology, the indication as illustrated in Table 5.3.1.1A-1. That is to say, the actual starting position of the UL transmission can be derived from the two bits indicating the starting position of uplink data transmission and the to-be-used carrier numerology in the NR system.

As an example, if the information on the determined starting position of uplink data transmission indicates "01", for a terminal device in the LTE system, it means 25 μs in symbol 0, however, for a terminal device in the NR system, it might means 25 μs in any of symbols 0, 1, 2, 3, 4, and 5, which is dependent on the numerology used in the NR system. In such a case, it may further determine the actual starting position by means of the numerology. For example, if the SCS is 60 KHz, then the symbol length is 17.9 μs and thus it means 25 μs in symbol 1; while if the SCS is 120 KHz, the symbol length is 8.95 μs and thus it means 25 μs in symbol 2.

As another example, if the information on the determined starting position of uplink data transmission indicates "11", for a terminal device in the LTE system, it means symbol 1, however, for a terminal device in the NR system, it might means any of symbols 1, 2, 3, 6, or even symbol of the next slot/subslot, which is dependent on the numerology used in the NR system. In such a case, it may further determine the actual starting position by means of the numerology. For example, if the SCS is 60 KHz, then the symbol length is 17.9p and thus it means the start boundary symbol 2, while if the CSC is 120 KHz, the symbol length is 8.95 μs and thus it means the start boundary of symbol 3.

In another embodiment of the present disclosure, it can provide, for respective numerologies, different mapping tables between the starting positions and the information on starting positions of uplink data transmission. Thus, the starting position of uplink data transmission can be determined based on the information on the starting position of uplink data transmission and a mapping between information on starting positions of uplink data transmission and starting positions of uplink data transmission, which is corresponding to the to-be-used carrier numerology. In such a case, it may first choose a mapping table corresponding to the to-be-used numerology in response to the reception of the information on the starting position of uplink data transmission, and then obtain the indicated starting position from the mapping table using the information on the starting position of uplink data transmission.

For illustration purposes, Tables 1 and 2 give the PUSCH starting position for SCS=30 KHz and for SCS=60 KHz respectively. When the to-be-used numerology is 30 KHz, Table 1 will be chosen, while the to-be-used numerology is 60 KHz, Table 2 will be chosen. With the information on the determined starting position of uplink data transmission, for example "11", the starting position, symbol 2 can be obtained based on the mapping Table 2.

TABLE 1

PUSCH starting position for SCS = 30 KHz

| Value | PUSCH starting position |
|---|---|
| 00 | symbol 0 |
| 01 | 25 μs in symbol 0 |
| 10 | (25 + TA)μs in symbol 0 |
| 11 | Symbol 1 |

TABLE 2

PUSCH starting position for SCS = 60 KHz

| Value | PUSCH starting position |
|---|---|
| 00 | symbol 0 |
| 01 | 25 μs in symbol 1 |
| 10 | (25 + TA)μs in symbol 1 |
| 11 | Symbol 2 |

It shall be noted that PUSCH starting position for other values of SCS, like 120 KHz, 240 KHz can be given in a similar way. In addition, the above tables are just illustrated for purposes and the present disclosure is not limited thereto.

In an embodiment of the present disclosure, it can provide a relationship between the actual starting position with the information on the determined starting position of uplink data transmission and the to-be-used numerology, wherein the relationship may contain the to-be-used carrier numerology as a parameter. Thus, the starting position of uplink data transmission can be determined based on the information on the starting position of uplink data transmission, the to-be-used carrier numerology and a relationship between the information on the starting position of uplink data transmission and starting position of uplink data transmission. As an example, the relationship described with reference to Equation 1 can be taken as an example of the relationship equation to determine the symbol Y. The symbol in which the M μs and (M+TA) μs are located can be determined similarly by a round down operation based on the to-be-used numerology.

In another embodiment of the present disclosure, the starting position of uplink data transmission may be at the symbol boundary alone. As an example, when the SCS=60 KHz, the possible starting positions includes at least one of symbol 0 and symbol 2. Then 1 bit DCI can be used to indicate 2 possible starting positions for UL data transmission on the unlicensed band in the NR system.

In an embodiment of the present disclosure, the terminal device may perform a Clear Channel Assessment (CCA) at a slot start boundary to give other wireless device or terminal device a transmission opportunity. The start symbol of the UL data transmission is based on the to-be used carrier numerology.

As illustrated in FIG. 9, for SCS of 60 KHz, the CCA is performed from the start boundary of symbol 0 in each slot. For a case in which one slot includes 7 symbols or 14 symbols, when M=25 μs, n=2, the symbol length=17.95 and thus Y=2. So the possible starting position is any of symbol 0, 25 μs in symbol 1, (25+TA) in symbol 1, or symbol 2. The specific symbol in which the (25+TA) μs is located is dependent on the value of the TA.

In a further embodiment of the present disclosure, in order to save CCA overhead, the terminal device does not perform CCA at each slot, instead, it performs the CCA from a start boundary of only part of slots within a subframe. The start symbol of the UL data transmission in the CCA slots can be based on the numerology.

As an example, as illustrated in FIG. 10, the terminal device may perform the CCA at slot 0 or slot 4 in a subframe containing 8 slots. The number of CCA slots can be determined by the terminal device in various manners. In an embodiment of the present disclosure, the number of CCA slots can be indicated by gNB signaling through RRC or DCI, as illustrate in step 403 in FIG. 4. For example, the network device can indicate the terminal device how many CCA slots are in each subframe. In another embodiment of the present disclosure, the number of CCA slots in each subframe is predefined, which is both known by the gNB and UE.

In addition, the number of CCA slots can be fixed for different numerologies, for example, as 2. As an alternative, the number of CCA can be different for different numerologies, which can be determined based on the numerologies. FIG. 11 illustrates the relationship of the number of CCA in a subframe and the carrier numerologies according to an embodiment of the present disclosure. As illustrated in FIG. 11, the number of CCA slots can be scaled with the SCS as well as the number of symbols in a slot. In other words, for different SCS, the numbers of CCA slots are different; for the same SCS but different numbers of symbols in a slot, the numbers of CCA slots are different too.

Figure 12:
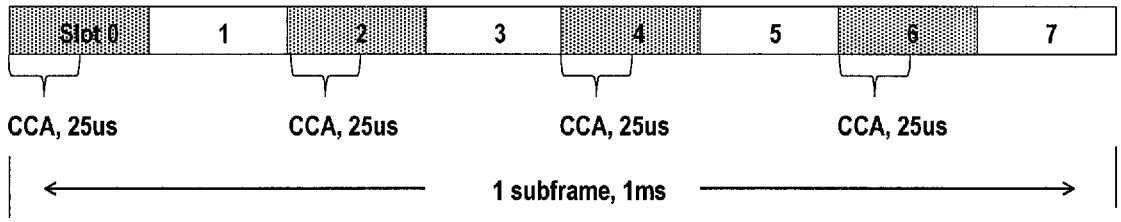
FIG. 12 schematically illustrates further example opportunities of CCA in the NR system according to an embodiment of the present disclosure.

FIG. 12 further illustrates example opportunities of CCA in the NR system with SCS of 60 KHz and 7 symbols in a slot according to an embodiment of the present disclosure. As illustrated in FIG. 12, in a case of SCS of 60 KHz and 7 symbols in a slot, it may contain four CCA slots in a subframe, e.g., slots 0, 2, 4, and 6.

With the solution as provided in the present disclosure, it may enable the UL data transmission on the unlicensed band in the NR system and thus improve the performance of the NR system.

Figure 13:
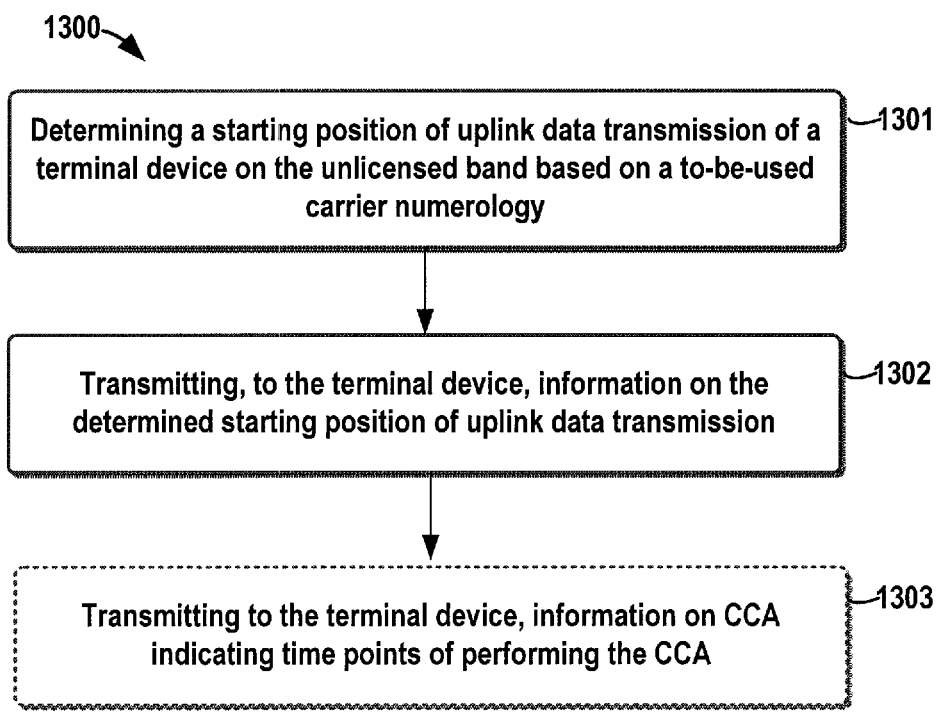
FIG. 13 schematically illustrates a flow chart of a method of uplink data scheduling according to an embodiment of the present disclosure.

FIG. 13 illustrates schematically illustrates a flow chart of a method of uplink data scheduling according to an embodiment of the present disclosure. The method 1300 can be performed at a network device or network node, for example gNB, or other like network devices.

As illustrated in FIG. 13, first in step 1301, the network device may determine the starting position of uplink data transmission of a terminal device on the unlicensed band based on the to-be used carrier numerology. For example, it may determine, for a SCS of 120 KHz, to start the UL data transmission from symbol 3 while for a SCS of 60 KHz, start the UL data transmission from symbol 2.

Then, in step 1302, the network device can determine information on the determined starting position of uplink data transmission to indicate when the UL data transmission shall start.

In an embodiment of the present disclosure, the information on the determined starting position of uplink data transmission may indicate, together with the to-be-used carrier numerology, the determined starting position of uplink data transmission of the terminal device. From the description with reference to FIGS. 5 to 8, it can be seen that the possible starting positions are related to the numerology to be used in the NR system. Thus, it is also possible to reuse, in combination with the to-be-used numerology, the indication as illustrated in Table 5.3.1.1A-1. That is to say, the actual starting position of the UL transmission can be derived from the information on the determined starting position of uplink data transmission and the to-be-used carrier numerology in the NR system.

In another embodiment of the present disclosure, the information on the determined starting position of uplink data transmission may indicate the determined starting position of uplink data transmission of the terminal device alone. For example, three or more bits can be used to indicate more possible starting positions of the UL data transmission on the unlicensed band than those illustrated in for example Table 5.3.1.1A-1. As an example, three bits in DCI can be used to indicate four additional possible starting positions for UL data transmission on the unlicensed band in the NR system. As another example, four bits in DCI can be used to indicate twelve additional possible starting positions for UL data transmission on the unlicensed band in the NR system. In such a case, the bits themselves can indicate the starting position for UL data transmission on the unlicensed band in the NR system.

Optionally, in step 1303, the network device may further transmit, to the terminal device, information on Clear Channel Assessment (CCA) indicating time points of performing the CCA to the terminal device. In such a way, the terminal device can learn when to perform CCA based on information on CCA.

Embodiments of the method of UL data scheduling are described in brief hereinbefore with reference to FIG. 13. However, for some details shared by the UL data transmission at the terminal device, one may refer to description with reference to FIGS. 4 to 12.

Figure 14:
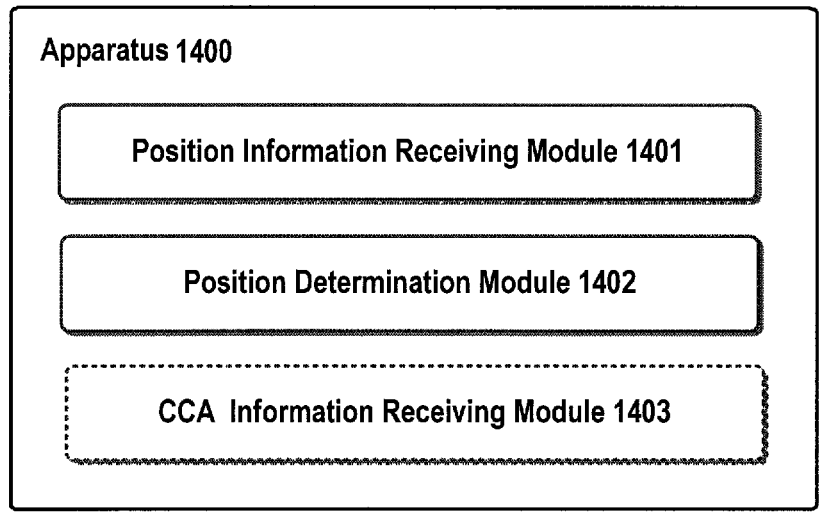
FIG. 14 schematically illustrates a block diagram of an apparatus for uplink data transmission according to an embodiment of the present disclosure.

FIG. 14 schematically illustrates a block diagram of an apparatus for uplink data transmission according to an embodiment of the present disclosure. Apparatus 1400 can be implemented at a terminal device such as the UE.

As illustrated in FIG. 14, Apparatus 1400 may include a position information receiving module 1401 and a position determination module 1402. The position information receiving module 1401 may be configured to receive, from a network device, information on a starting position of uplink data transmission on the unlicensed band. The position determination module 1402 may be configured to determine a starting position of uplink data transmission from the information on the starting position of uplink data transmission, wherein the determined starting position of uplink data transmission is associated with a to-be-used carrier numerology.

In an embodiment of the present disclosure, the position determination module 1402 may be configured to determine the starting position of uplink data transmission based on the information on the starting position of uplink data transmission and the to-be-used carrier numerology.

In another embodiment of the present disclosure, the information on the starting position of uplink data transmission may indicate the determined starting position of uplink data transmission of the terminal device alone.

In a further embodiment of the present disclosure, the position determination module 1402 may be configured to determine the starting position of uplink data transmission based on the information on the starting position of uplink data transmission and a mapping between information on starting positions of uplink data transmission and starting positions of uplink data transmission, which is corresponding to the to-be-used carrier numerology.

In a further embodiment of the present disclosure, the position determination module 1402 may be configured to determine the starting position of uplink data transmission based on the information on the starting position of uplink data transmission, the to-be-used carrier numerology and a relationship between the information on starting positions of uplink data transmission and starting positions of uplink data transmission, the relationship containing the to-be-used carrier numerology as a parameter.

In a still further embodiment of the present disclosure, the CCA can be performed from one or more of: a slot start boundary; and a start boundary of part of slots within a subframe.

In a yet further embodiment of the present disclosure, the number of CCA symbols within a subframe can be dependent on the to-be-used carrier numerology.

In a yet still embodiment of the present disclosure, apparatus 1400 may further include a CCA information receiving module 1403, which is configured to receive information on CCA indicating time points of performing the CCA from the network device.

Figure 15:
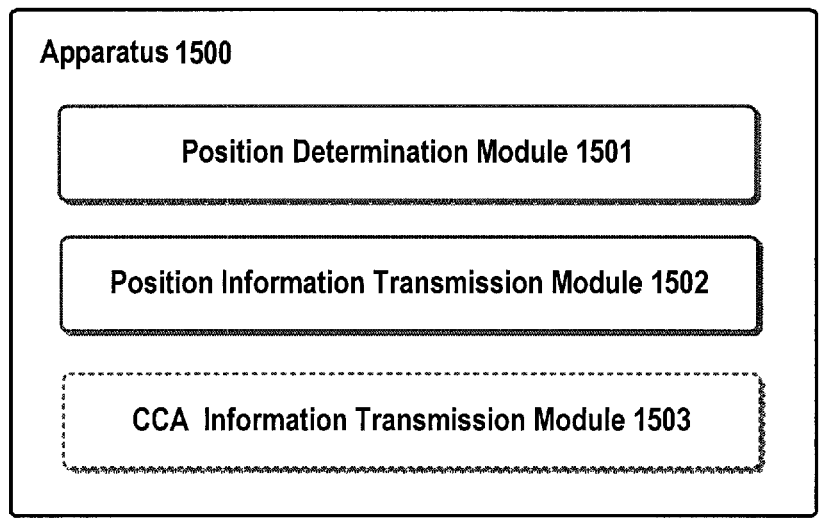
FIG. 15 schematically illustrates a block diagram of an apparatus for uplink data scheduling according to an embodiment of the present disclosure.

FIG. 15 schematically illustrates a block diagram of an apparatus for uplink data scheduling according to an embodiment of the present disclosure. Apparatus 1500 can be implemented at a network device such as gNB.

As illustrated in FIG. 15, apparatus 1500 may comprise a position determination module 1501 and the position information transmission module 1502. The position determination module 1501 can be configured to determine a starting position of uplink data transmission of a terminal device on the unlicensed band based on a to-be-used carrier numerology. The position information transmission module 1502 can be configured to transmit, to the terminal device, information on the determined starting position of uplink data transmission.

In an embodiment of the present disclosure, the information on the determined starting position of uplink data transmission can indicate, together with the to-be-used carrier numerology, the determined starting position of uplink data transmission of the terminal device.

In another embodiment of the present disclosure, the information on the determined starting position of uplink data transmission can indicate the determined starting position of uplink data transmission of the terminal device alone.

In a further embodiment of the present disclosure, apparatus 1500 further comprises a CCA information transmission module 1503. The CCA information transmission module 1503 may be configured to transmit information on Clear Channel Assessment (CCA) indicating time points of performing the CCA to the terminal device.

Hereinbefore, apparatuses 1400 and 1500 are described with reference to FIGS. 14 and 15 in brief. It can be noted that the apparatuses 1400 and 1500 may be configured to implement functionalities as described with reference to FIGS. 4 to 13. Therefore, for details about the operations of modules in these apparatuses, one may refer to those descriptions made with respect to the respective steps of the methods with reference to FIGS. 4 to 13.

It is further noted that components of the apparatuses 1400 and 1500 may be embodied in hardware, software, firmware, and/or any combination thereof. For example, the components of apparatuses 1400 and 1500 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 400 and 500 may comprise at least one processor. The at least one processor suitable for use with embodiments of the present disclosure may include, by way of example, both general and special purpose processors already known or developed in the future. Apparatuses 1400 and 1500 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1400 and 1500 to at least perform operations according to the method as discussed with reference to FIGS. 4 to 13 respectively.

Figure 16:
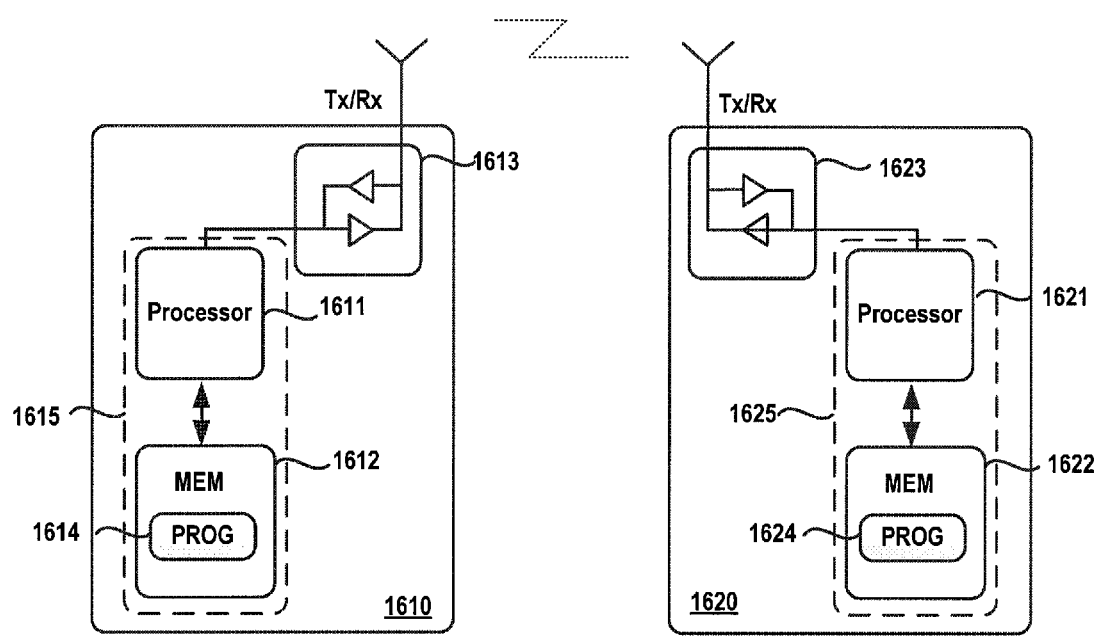
FIG. 16 schematically illustrates a simplified block diagram of an apparatus 1610 that may be embodied as or comprised in a network device (like gNB), and an apparatus 1620 that may be embodied as or comprised in a terminal device like UE as described herein.

FIG. 16 further illustrates a simplified block diagram of an apparatus 1610 that may be embodied as or comprised in a network device like a base station in a wireless network and an apparatus 1620 that may be embodied as or comprised in a terminal device like UE as described herein.

The apparatus 1610 comprises at least one processor 1611, such as a data processor (DP) and at least one memory (MEM) 1612 coupled to the processor 1611. The apparatus 1610 may further comprise a transmitter TX and receiver RX 1613 coupled to the processor 1611, which may be operable to communicatively connect to the apparatus 1620. The MEM 1612 stores a program (PROG) 1614. The PROG 1614 may include instructions that, when executed on the associated processor 1611, enable the apparatus 1610 to operate in accordance with embodiments of the present disclosure, for example the method 1300. A combination of the at least one processor 1611 and the at least one MEM 1612 may form processing means 1615 adapted to implement various embodiments of the present disclosure.

The apparatus 1620 comprises at least one processor 1621, such as a DP, and at least one MEM 1622 coupled to the processor 1621. The apparatus 1620 may further comprise a suitable TX/RX 1623 coupled to the processor 1621, which may be operable for wireless communication with the apparatus 1610. The MEM 1622 stores a PROG 1624. The PROG 1624 may include instructions that, when executed on the associated processor 1621, enable the apparatus 1620 to operate in accordance with the embodiments of the present disclosure, for example to perform the method 400. A combination of the at least one processor 1621 and the at least one MEM 1622 may form processing means 1625 adapted to implement various embodiments of the present disclosure.

Various embodiments of the present disclosure may be implemented by computer program executable by one or more of the processors 1611, 1621, software, firmware, hardware or in a combination thereof.

The MEMs 1612 and 1622 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1611 and 1621 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a user equipment (UE), the method comprising:

receiving, from a base station, first information in a Downlink Control Information (DCI) format, wherein the first information indicates a first temporal value of one of a symbol index, a duration corresponding to a channel access procedure, or a sum of the duration corresponding to the channel access procedure and a timing advance duration for an uplink transmission;

receiving, from the base station, second information in a Radio Resource Control (RRC) signaling;

identifying: a symbol, in which, a starting position of the uplink transmission is located; and a location within the symbol, in which, the starting position is located, based on the first temporal value, a subcarrier spacing configuration value configured for the uplink transmission, and the second information; and performing, based on the channel access procedure, the uplink transmission from the starting position.

2. The method of claim 1, wherein the uplink transmission is a Physical Uplink Shared Channel (PUSCH) transmission.

3. The method of claim 1, wherein the starting position is after the duration corresponding to the channel access procedure within the symbol.

4. The method of claim 1, wherein the starting position is after the duration corresponding to the channel access procedure and the timing advance duration within the symbol.

5. The method of claim 1, wherein a subsequent symbol, following the symbol where the starting position is located, is fully occupied by the uplink transmission.

6. The method of claim 1, wherein the symbol where the starting position is located is partially occupied by the uplink transmission.

7. The method of claim 1, wherein the first information comprises one or more indices, and wherein the first temporal value corresponds to one or more position values,
and each of the one or more position values maps to each of the one or more indices respectively.

8. A method performed by a base station, the method comprising:

sending, to a user equipment (UE), first information in a Downlink Control Information (DCI) format, wherein the first information indicates a first temporal value of one of a symbol index, a duration corresponding to a channel access procedure, or a sum of the duration corresponding to the channel access procedure and a timing advance duration for an uplink transmission;

sending, to the UE, second information in a Radio Resource Control (RRC) signaling;

wherein a symbol, in which, a starting position of the uplink transmission is located; and where the starting position is located within the symbol are identified by the UE, based on the first temporal value, subcarrier spacing configuration value configured for the uplink transmission, and the second information; and receiving, by the base station, the uplink transmission based on the channel access procedure, from the starting position.

9. The method of claim 8, wherein the uplink transmission is a Physical Uplink Shared Channel (PUSCH) transmission.

10. The method of claim 8, wherein the starting position is after the duration corresponding to the channel access procedure within the symbol.

11. The method of claim 8, wherein the starting position is after the duration corresponding to the channel access procedure and the timing advance duration within the symbol.

12. The method of claim 8, wherein a subsequent symbol, following the symbol where the starting position is located, is fully occupied by the uplink transmission.

13. The method of claim 8, wherein the symbol where the starting position is located is partially occupied by the uplink transmission.

14. The method of claim 8, wherein the first information comprises one or more indices, and wherein the first temporal value corresponds to one or more position values, and each of the one or more position values maps to each of the one or more indices respectively.

15. A user equipment (UE), comprising:
a receiver configured to:
receive from a base station, first information in a Downlink Control Information (DCI) format, wherein the first information indicates a first temporal value of one of a symbol index, a duration corresponding to a channel access procedure, or a sum of the duration corresponding to the channel access procedure and a timing advance duration for an uplink transmission, and
receive, from the base station, second information in a Radio Resource Control (RRC) signaling;
a processor configured to identify: a symbol where a starting position of the uplink transmission is located; and where the starting position is located within the symbol, based on the first temporal value, a subcarrier spacing configuration value configured for the uplink transmission and the second information; and
a transmitter configured to perform, based on the channel access procedure, the uplink transmission from the starting position.

* * * * *